US006788699B1

United States Patent
Yoshikawa

(10) Patent No.: US 6,788,699 B1
(45) Date of Patent: Sep. 7, 2004

(54) OUTPUT BUFFER TYPE ASYNCHRONOUS TRANSFER MODE SWITCH

(75) Inventor: Suminori Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 871 days.

(21) Appl. No.: 09/688,799

(22) Filed: Oct. 17, 2000

(30) Foreign Application Priority Data

Oct. 20, 1999 (JP) .......................................... 11/298209

(51) Int. Cl.⁷ ............................................. H04L 12/16
(52) U.S. Cl. .................................................... 370/417
(58) Field of Search ................................ 370/412–423, 370/389–395, 395.71, 229, 428; 714/712–714

(56) References Cited

U.S. PATENT DOCUMENTS

| | | | | |
|---|---|---|---|---|
| 4,754,451 A | * | 6/1988 | Eng et al. .................... | 370/417 |
| 4,760,570 A | * | 7/1988 | Acampora et al. .......... | 370/417 |
| 5,612,951 A | * | 3/1997 | Yu et al. .................. | 370/395.1 |
| 5,619,510 A | * | 4/1997 | Kurano ....................... | 714/712 |
| 5,757,799 A | * | 5/1998 | LaRue ......................... | 370/417 |
| 6,563,837 B2 | * | 5/2003 | Krishna et al. ............. | 370/413 |
| 6,570,876 B1 | * | 5/2003 | Aimoto ....................... | 370/389 |

* cited by examiner

Primary Examiner—Chi Pham
Assistant Examiner—Prenell Jones
(74) Attorney, Agent, or Firm—Foley and Lardner LLP

(57) ABSTRACT

The invention performs a cell switching operation of switching cells of a connection being higher in transmission rate than an existing switch port by means of the existing switch. Namely, the invention bundles a plurality of input ports and a plurality of output ports respectively to make a high-speed input port and a high-speed output port, separates cells inputted through the high-speed input port so that they have an ordinary transmission rate, and multiplexes the cells to be outputted through the high-speed output port so that they have the transmission rate of the high-speed output port. Furthermore, the invention gives a cell a number indicating the order in which said cell has been inputted from each of the input ports including the high-speed input port and corrects the order of the cells outputted from the output buffers into the order in which they have been inputted, on the basis of the numbers added to the cells.

13 Claims, 9 Drawing Sheets

| LOGICAL CONNECTION NUMBER | SEQUENCE NUMBER |
|---|---|
| 0 | 0 |
| 1 | 14 |
| 2 | 2 |
| 3 | 0 |
| 4 | 0 |
| 5 | 33 |
| 6 | 35 |
| 7 | 10 |
| ⋮ | ⋮ |

Fig. 3

| REPRESENTATIVE OUTPUT CIRCUIT NUMBER | OUTPUT BUFFER NUMBER | | |
|---|---|---|---|
| | FOREFRONT OUTPUT BUFFER NUMBER | END OUTPUT BUFFER NUMBER | LATEST OUTPUT BUFFER NUMBER |
| 1 | 1 | 4 | 3 |
| 5 | 5 | 5 | 5 |
| 6 | 6 | 6 | 6 |
| 7 | 7 | 7 | 7 |
| 8 | 8 | 8 | 8 |

Fig. 4

OUTPUT BUFFER TYPE ASYNCHRONOUS TRANSFER MODE SWITCH

CROSS REFERENCE TO RELATED APPLICATIONS

The present invention claims priority from Japanese Patent Application No. 11-298209 filed Oct. 20, 1999, the contents of which are incorporated herein by reference.

BACKGROUND OF THE INVENTION

1. Field of the Invention

The present invention relates to an ATM (asynchronous transfer mode) switch to be used in a digital communication network, and more particularly to an output buffer type ATM switch having a buffer for each circuit at the output side.

2. Description of Related Art

Up to now, an output buffer type ATM switch out of ATM switches used in a digital communication network is provided with switch ports having the same transmission rate as one another and being equal in number at the input side and the output side, respectively.

FIG. 9 shows a composition example of a conventional output buffer type ATM switch, and shows an output buffer type ATM switch having a switch capacity of 5 G bps which is provided with eight switch ports each having a transmission rate of 600 Mbps at each of the input and output sides.

As shown in FIG. 9, this composition example, which switches cells transmitted between eight input circuits 130-1 to 130-8 and eight output circuits 140-1 to 140-8, comprises input ports 121-1 to 121-8 which have each a transmission rate of 600 Mbps and have cells inputted from the input circuits 130-1 to 130-8, input buffers 122-1 to 122-8 for temporarily storing in them cells inputted through the input ports 121-1 to 121-8, a multiplexer 111 for multiplexing and outputting cells inputted through the input ports 121-1 to 121-8 onto a bus having a transmission rate of 5 G bps, address filters 112-1 to 112-8 which are respectively provided correspondingly to the output circuits 140-1 to 140-8 and each of which makes only the cells addressed to its own circuit out of cells multiplexed by the multiplexer 111 pass through it, output buffers 113-1 to 113-8 for temporarily storing in them the cells which have passed through the address filters 112-1 to 112-8, and output ports 114-1 to 114-8 which have each a transmission rate of 600 Mbps and output the cells outputted from the output buffers 113-1 to 113-8 to the output circuits 140-1 to 140-8. Although not illustrated, a logical connection number/output circuit number conversion table for identifying a logical connection number from a VP (virtual path)/VC (virtual channel) written in the header of an inputted cell and giving an output circuit number being an output destination corresponding to a cell having the logical connection number is provided at a stage before the said ATM switch.

A switching operation of an output buffer type ATM switch composed as described above is described in the following.

When cells from the input circuits 130-1 to 130-8 are inputted through 121-1 to 121-8, the inputted cells are multiplexed by the multiplexer 111, and are outputted onto a bus having a transmission rate of 5 G bps. Next, only the cells addressed to their own output circuits by their circuit numbers out of the cells which have been multiplexed by the multiplexer 111 and outputted onto the bus pass respectively through the address filters 112-1 to 112-8 provided respectively correspondingly to the output circuits 140-1 to 140-8, and are inputted into the output buffers 113-1 to 113-8. In the output buffers 113-1 to 113-8, the cells outputted onto the bus at a transmission rate of 5 G bps from the multiplexer 111 are temporarily stored and are outputted at a transmission rate of 600 Mbps. After that, the cells outputted from the output buffers 113-1 to 113-8 are outputted through the output ports 114-1 to 114-8 to the output circuits 140-1 to 140-8.

Hereupon, in order to prevent cells from being discarded in case that overflow of the cells occurs due to a fact that outputting the cells lags behind inputting the cells in the output buffers 113-1 to 113-8, a control of sending a back pressure signal to the input buffers 122-1 to 122-8 is performed. A threshold value is provided to each of the output buffers 113-1 to 113-8, and when the number of cells staying in an output buffer exceeds this threshold value, the relevant output buffer sends a back pressure signal to all the input buffers 122-1 to 122-8. The input buffers 122-1 to 122-8 temporarily stop sending cells addressed to an output circuit corresponding to the output buffer sending a back pressure signal out of the output circuits 140-1 to 140-8. By this, cells are prevented from being discarded in the output buffers 113-1 to 113-8 in which there is the possibility that overflow of cells occurs.

In a digital communication after now, with the increase of traffic capacity it is required to realize switching of cells in connection having a capacity not less than the transmission rate of a switch port in an ATM switch. For example, it is required to enable an ATM switch which is provided with a plurality of switch ports each having a transmission rate of 600 Mbps and has a switch capacity of 5 G bps like the above-mentioned output buffer type ATM switch to contain a circuit having a transmission rate of 2.4 G bps and set a connection having a band of 600 Mbps or more.

Since an output buffer type ATM switch as described above has ports being equal in transmission rate to one another, however, it cannot switch a connection having a band being higher than the transmission rate of an input port. For example, cells inputted from an input port at a transmission rate of 600 Mbps can be outputted to an output port at a transmission rate of 600 Mbps, but cells from an input circuit having a transmission rate of 2.4 G bps and a connection band of 800 Mbps cannot be inputted into this input port.

In order to meet such a requirement, it is conceivable to improve the capability of a device forming an ATM switch and form a switch having the same architecture and switch ports made higher in transmission rate, but in this case there is a problem that a switch having switch ports made higher in transmission rate must be newly designed and an excessive time and cost are required for designing such a switch.

SUMMARY OF THE INVENTION

The present invention has been performed in consideration of the problems of the prior art as described above, and aims at providing an output buffer type ATM switch capable of switching cells of a connection higher in transmission rate than an existing switch port by means of an existing switch.

In order to attain the above-mentioned object, the present invention provides an output buffer type ATM switch comprising;

a plurality of input ports into which cells from input circuits are inputted, a first multiplexer for multiplexing cells inputted through said plurality of input ports, a plurality of output ports for sending out cells to output circuits, a plurality of filters which are provided correspondingly to said output ports and make only the cells addressed to the corresponding output ports out of cells multiplexed by said first multiplexer pass through them, and a plurality of output buffers for temporarily storing in them the cells which have passed through said plurality of filters, in which ATM switch the cells stored in said plurality of output buffers are outputted to said output circuits through said plurality of output ports, wherein;

at least one input port out of said plurality of input ports and at least one output port out of said plurality of output ports are respectively a high-speed input port and a high-speed output port each having a transmission rate being 2 or larger integer times higher than the other input and output ports, respectively, and said ATM switch comprises;

numbering parts which are provided correspondingly to said plurality of input ports and add a sequence number indicating the order in which said cell has been inputted for its logical connection number to a cell inputted from each of said plural input ports, a demultiplexer for separating cells which are inputted through said high-speed input port and each are added a number by said numbering part to a plurality of paths so that said cells become equal in transmission rate to cells inputted through the other input ports than said high-speed input port, a second multiplexer for multiplexing and outputting cells outputted from a plurality of output buffers corresponding to said high-speed output port out of said plurality of output buffers at the transmission rate of said high-speed output port, and order restoring parts which are provided correspondingly to said plurality of output ports and which, on the basis of said sequence numbers added to the cells multiplexed and outputted by said second multiplexer and the cells outputted from the other output buffers than the output buffers corresponding to said high-speed output port, correct the order of outputting said cells and output them, and wherein;

said first multiplexer multiplexes the cells inputted through the other input ports than said high-speed input port and the cells separated by said demultiplexer.

And the present invention is characterized by an output buffer type ATM switch comprising input buffers in which cells inputted through said plurality of input ports are temporarily stored, wherein;

each of said plurality of output buffers sends a signal to stop the cells addressed to the output buffer itself being sent to said input buffers when the number of cells to be stored in the said output buffer exceeds a predetermined threshold value, and each of said input buffers temporarily stores in it cells addressed to the output buffer which has sent said signal when it receives the said signal.

And the present invention is characterized by an output buffer type ATM switch wherein said input buffers are provided correspondingly to said plurality of input ports.

And the present invention is characterized by an output buffer type ATM switch wherein said numbering part comprises;

a header information detecting part for detecting an output circuit number and a logical connection number from a cell inputted through said input port, a sequence number table in which a sequence number added to a cell transmitted at the last time by a logical connection is set for each logical connection number, an output buffer number table in which information about said plurality of output buffers is stored, a sequence number control part for retrieving said sequence number and said output buffer number from said sequence number table and said output buffer number table on the basis of an output circuit number and a logical connection number detected by said header information detecting part, and a cell header information adding part for adding a sequence number and an output buffer number retrieved by said sequence number control part to a cell.

And the present invention is characterized by an output buffer type ATM switch wherein said order restoring part comprises;

a cell distributing part for distributing cells to each connection on the basis of logical connection numbers added to the cells, a plurality of cell order restoring parts each of which corrects the order of sending cells on the basis of sequence numbers added to the cells, and a cell multiplexing part for multiplexing cells corrected in order of sending by said plurality of cell order restoring parts.

And the present invention is characterized by an output buffer type ATM switch wherein said output buffer number table stores in it the number of each of said output circuits, the forefront output buffer number and the end output buffer number in an output circuit corresponding to each output circuit number, and the latest output buffer number added to a cell transmitted at the last time out of output buffers included between the forefront output buffer number and the end output buffer number.

And the present invention is characterized by an output buffer type ATM switch wherein said sequence number control part, when adding said output buffer number to a cell, increments said latest output buffer number, sets said incremented number as a number to be added to the cell in case that the incremented number is not larger than the end output buffer number in said output circuit, and sets said latest buffer number as a number to be added to the cell as the forefront output buffer number in the said output circuit in case that the incremented number is larger than the end output buffer number.

And the present invention is characterized by an output buffer type ATM switch wherein said sequence number control part, when adding said sequence number to a cell, increments a sequence number corresponding to a logical connection number added to the cell, sets said incremented number as a number to be added to the cell in case that the incremented number is not larger than a number capable of being processed by said order restoring part, and sets said sequence number at "0" in case that the incremented number is larger than the number capable of being processed by said order restoring part and then sets a number obtained by incrementing the said number as a number to be added to the cell.

And the present invention is characterized by an output buffer type ATM switch wherein said sequence number control part, when a signal to stop a cell addressed to said output buffer being sent is sent from the said output buffer, does not add a cell the number of the output buffer which has sent the said signal.

In the present invention composed as described above, at least one input port out of a plurality of input ports and at least one output port out of said plurality of output ports are respectively a high-speed input port and a high-speed output port each having a transmission rate being 2 or larger integer times higher than the other input and output ports, respectively, and cells from an input circuit being higher in transmission rate are inputted through said high-speed circuit and separated by a demultiplexer so as to become ordinary in transmission rate. After this, cells separated by the demultiplexer and cells inputted through other input ports are multiplexed by a multiplexer and cells addressed to the respective circuits pass through a plurality of filters, respectively and are temporarily stored in output buffers and are outputted at transmission rates of the corresponding output ports to the output circuits. Cells to be outputted through the high-speed output port are temporarily stored in output buffers and then are multiplexed by the second multiplexer, and thereby the cells are made to have the transmission rate of the high-speed output port and are outputted through the high-speed output port to the output circuit.

Hereupon, it is necessary to compensate the order of outputting cells inputted from input ports from output ports. Thereupon, a cell is added a sequence number by providing a number adding part for adding the order of an inputted cell to the cell correspondingly to its input port. After this, the order of sending out the cells outputted from the output buffers is rearranged by the order restoring part to the order of being inputted on the basis of numbers added to said cells and thereby the order of sending out the cells is compensated.

BRIEF DESCRIPTION OF THE DRAWINGS

Specific embodiments of the present invention will now be described, by way of example only, with reference to the accompanying of drawings in which:

FIG. 3 is a figure showing an example of information stored in a sequence number table shown in FIG. 2.

FIG. 4 is a figure showing an example of information stored in an output buffer number table shown in FIG. 2.

DETAILED DESCRIPTION OF THE PREFERRED EMBODIMENTS

Figure 1:
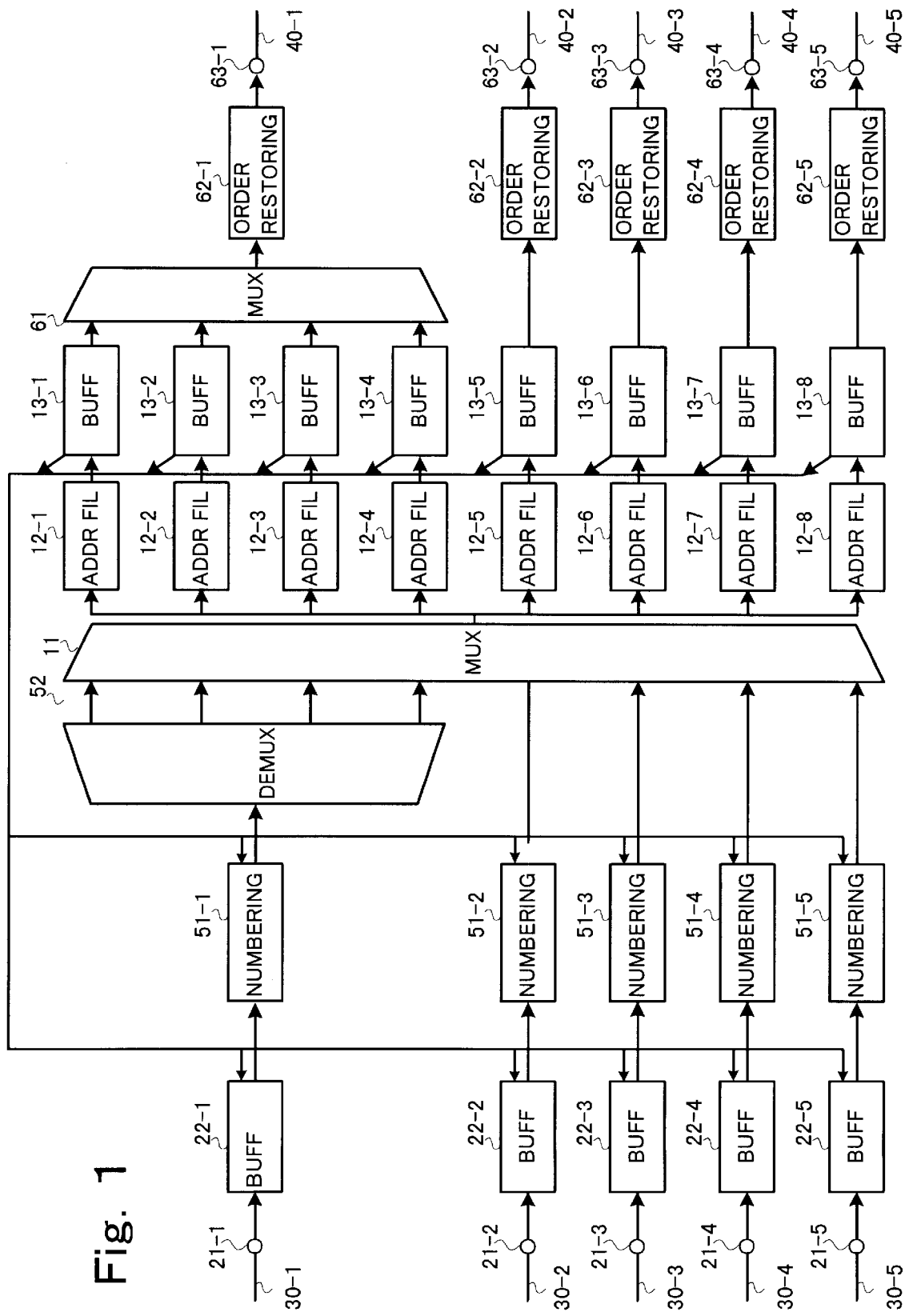
FIG. 1 is a block diagram showing an embodiment of an output buffer type ATM switch of the present invention.

FIG. 1 is a block diagram showing an embodiment of an output buffer type ATM switch of the present invention, and shows an output buffer type ATM switch having a switch capacity of 5 G bps which is provided with a switch port having a transmission rate of 2.4 G bps by bundling four switch ports each having a transmission rate of 600 Mbps and further provided with four switch ports each having a transmission rate of 600 Mbps at each of the input and output sides.

As shown in FIG. 1, this embodiment is an ATM switch which switches cells to be transmitted between five input circuits 30-1 to 30-5 and five output circuits 40-1 to 40-5, and comprises an input port 21-1 having a transmission rate of 2.4 G bps which has cells inputted from the input circuit 30-1, input ports 21-2 to 21-5 each having a transmission rate of 600 Mbps which have cells inputted from the input circuits 30-2 to 30-5, input buffers 22-1 to 22-5 for temporarily storing cells inputted through the input ports 21-1 to 21-5, numbering parts 51-1 to 51-5 for adding sequence numbers to cells inputted through the input ports 21-1 to 21-5 in order of input, a demultiplexer 52 for separating cells added sequence numbers by the numbering part 51-1 cyclically to four paths each having a transmission rate of 600 Mbps, a first multiplexer 11 for multiplexing and outputting the cells added sequence numbers by the numbering parts 51-2 to 51-5 and the cells separated by the demultiplexer 52 onto a bus having a transmission rate of 5 G bps, address filters 12-1 to 12-8 which are respectively provided correspondingly to the output circuits 40-2 to 40-5 and four circuits each having a transmission rate of 600 Mbps into which the output circuit 40-1 is separated and make only the cells addressed to their own circuits out of cells multiplexed by the multiplexer 11 pass through, output buffers 13-1 to 13-8 for temporarily storing the cells which have passed through the address filters 12-1 to 12-8, a second multiplexer 61 for multiplexing cells outputted from the output buffers 13-1 to 13-4, order restoring parts 62-1 to 62-5 for rearranging in order the cells multiplexed by the multiplexer 61 or the cells outputted from the output buffers 13-5 to 13-8 on the basis of sequence numbers added by the numbering parts 51-1 to 51-5, an output port 63-1 having a transmission rate of 2.4 G bps which outputs the cells outputted from the order restoring part 62-1 to the output circuit 40-1, output ports 63-2 to 63-5 each having a transmission rate of 600Mbps which output the cells outputted from the order restoring parts 62-2 to 62-5 to the output circuits 63-2 to 63-5.

Although not illustrated, a logical connection number/ output circuit number conversion table which identifies a logical connection number from a VP (virtual path)/VC (virtual channel) written in the header of an inputted cell and gives an output circuit number being an output destination corresponding to a cell having this logical connection number is provided at a stage before the said ATM switch. A correspondence relation between a logical connection number and an output circuit number is set in advance as control information for the switching operation.

Figure 6:
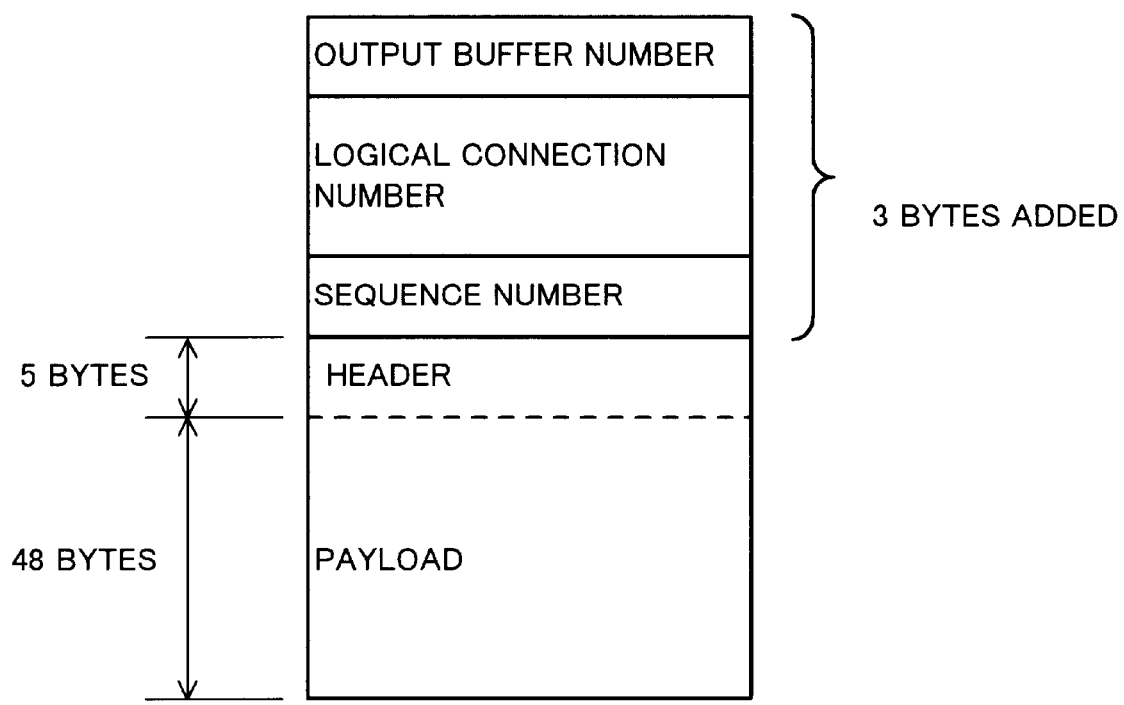
FIG. 6 is a conceptual diagram showing the composition of a cell to be processed in an ATM switch of the present invention.

FIG. 6 is a conceptual diagram showing the composition of a cell to be processed by the said ATM switch.

As shown in FIG. 6, information of 3 bytes comprising an output buffer number, a logical connection number and a sequence number is added to a cell having a payload of 48 bytes and a header of 5 bytes to be transmitted for a switching process in the said ATM switch. As described above, before being inputted into the said ATM switch, each cell is given a logical connection number and an output buffer number with reference to a logical connection number/output circuit number conversion table.

Hereupon, in case that such output circuits as the output circuits 40-2 to 40-5 of FIG. 1 and the output buffers correspond to each other on a one-to-one basis, an output buffer number is equivalent to an output circuit number. In case that such an output circuit as the output circuit 40-1 of FIG. 1 corresponds to the plurality of output buffers 13-1 to 13-4, however, its output buffer number is positioned as a representative output circuit number.

Assuming that an output circuit number in case that output buffers and output circuits correspond to each other on a one-to-one basis is also referred to as a representative output circuit number, therefore, as information added to a cell inputted into the said ATM switch a representative output circuit number is set in an output buffer number area and a logic connection number is set in a logical connection number area.

Figure 2:
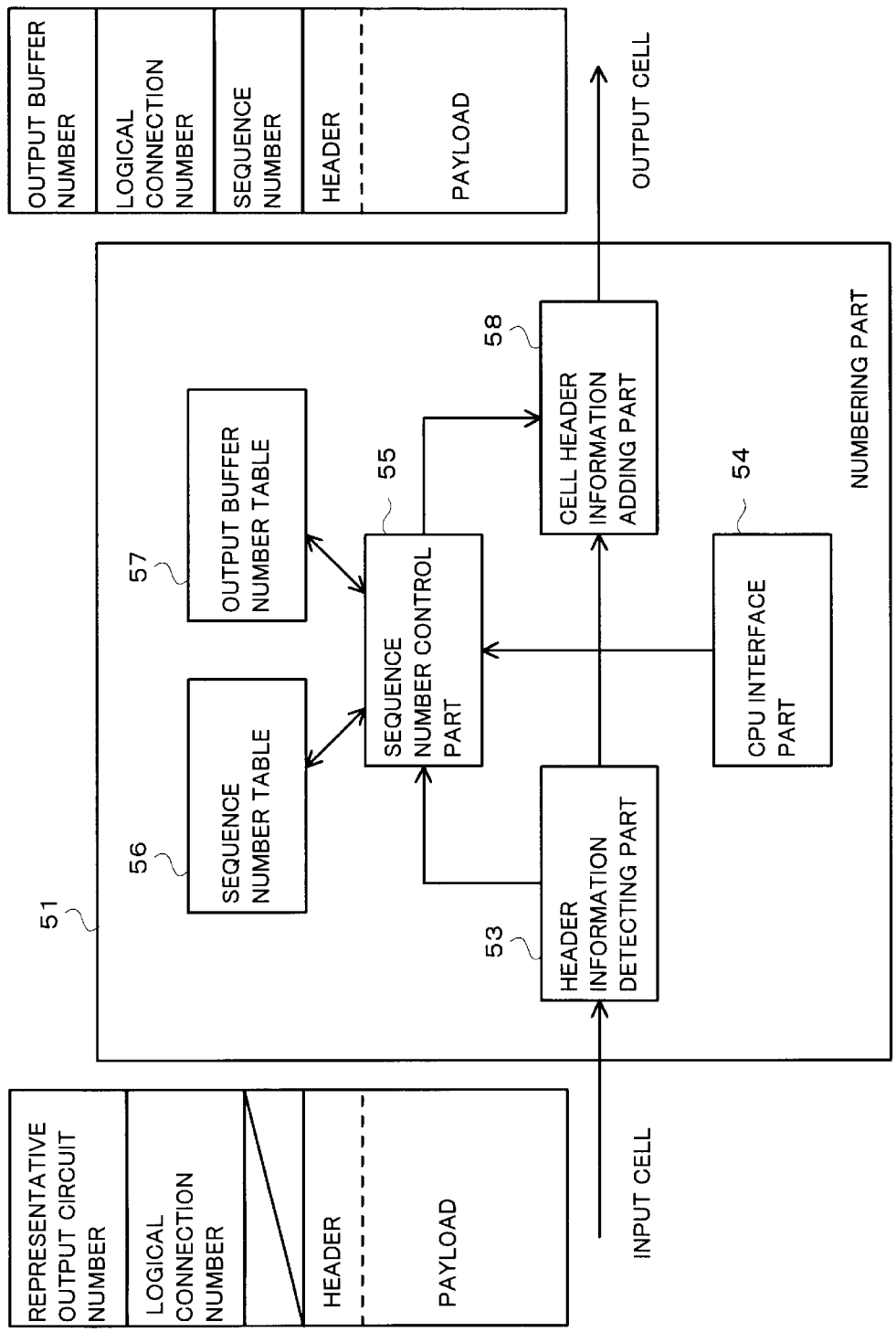
FIG. 2 is a block diagram showing a composition example of a numbering part shown in FIG. 1.

FIG. 2 is a block diagram showing a composition example of the numbering parts 51-1 to 51-5 shown in FIG. 1.

The numbering parts 51-1 to 51-5 each have a function which gives a sequence number to an inputted cell in order of input for each connection number of inputted cells and, in case that a representative output circuit number corresponds to a plurality of output buffers, allocates an output buffer to be used to each cell. Namely, the numbering parts 51-1 to 51-5 each converts or gives an output buffer number and a sequence number as new additional information as shown as an output cell example of FIG. 2 on the basis of a representative output circuit number and a logical connection number being additional information.

As shown in FIG. 2, a numbering part 51 in this embodiment is composed of a header information detecting part 53 for detecting an output circuit number (representative output circuit number and a logical connection number from a cell outputted from an input buffer 22, a sequence number control part 55 for retrieving a sequence number and an output buffer number from a sequence number table 56 and an output buffer number table 57 on the basis of a representative output circuit number and a logical connection number which are detected by the header information detecting part 53, a cell header information adding part 58 for adding an output buffer number and a sequence number retrieved by the sequence number control part 55 to a cell, and a CPU interface part 54.

FIG. 3 shows an example of information stored in the sequence number table 56 shown in FIG. 2, and FIG. 4 shows an example of information stored in the output buffer number table 57 shown in FIG. 2.

As shown in FIG. 3, a sequence number added to a cell transmitted at the last time for each logical connection number is stored in the sequence number table 56 and in case that a cell is newly inputted into the numbering part 51, a number obtained by adding 1 to the sequence number corresponding to the logical connection number of the cell is given to the cell as its sequence number.

And as shown in FIG. 4, in case of making each of the output circuits 40-1 to 40-5 (see FIG. 1) correspond to a representative circuit number, the forefront output buffer number, the end output buffer number and the output buffer number added to a cell transmitted at the last time out of output buffers included between the forefront output buffer number and the end output buffer number (the latest output buffer number) are stored in the output buffer number table 57 correspondingly to each representative circuit number. In case that output circuits and output buffers correspond to each other on a one-to-one basis like the output circuits 40-2 to 40-5 of FIG. 1, the forefront output buffer number and the end output buffer number are the same number. And in case that such an output circuit as the output circuit 40-1 corresponds to the output buffers 13-1 to 13-4, "1" is set as the forefront output buffer number and "4" is set as the end output buffer number.

Hereupon, an output buffer specifying operation and a sequence number giving operation in the above-mentioned numbering parts 51-1 to 51-5 are described in detail.

Figure 5:
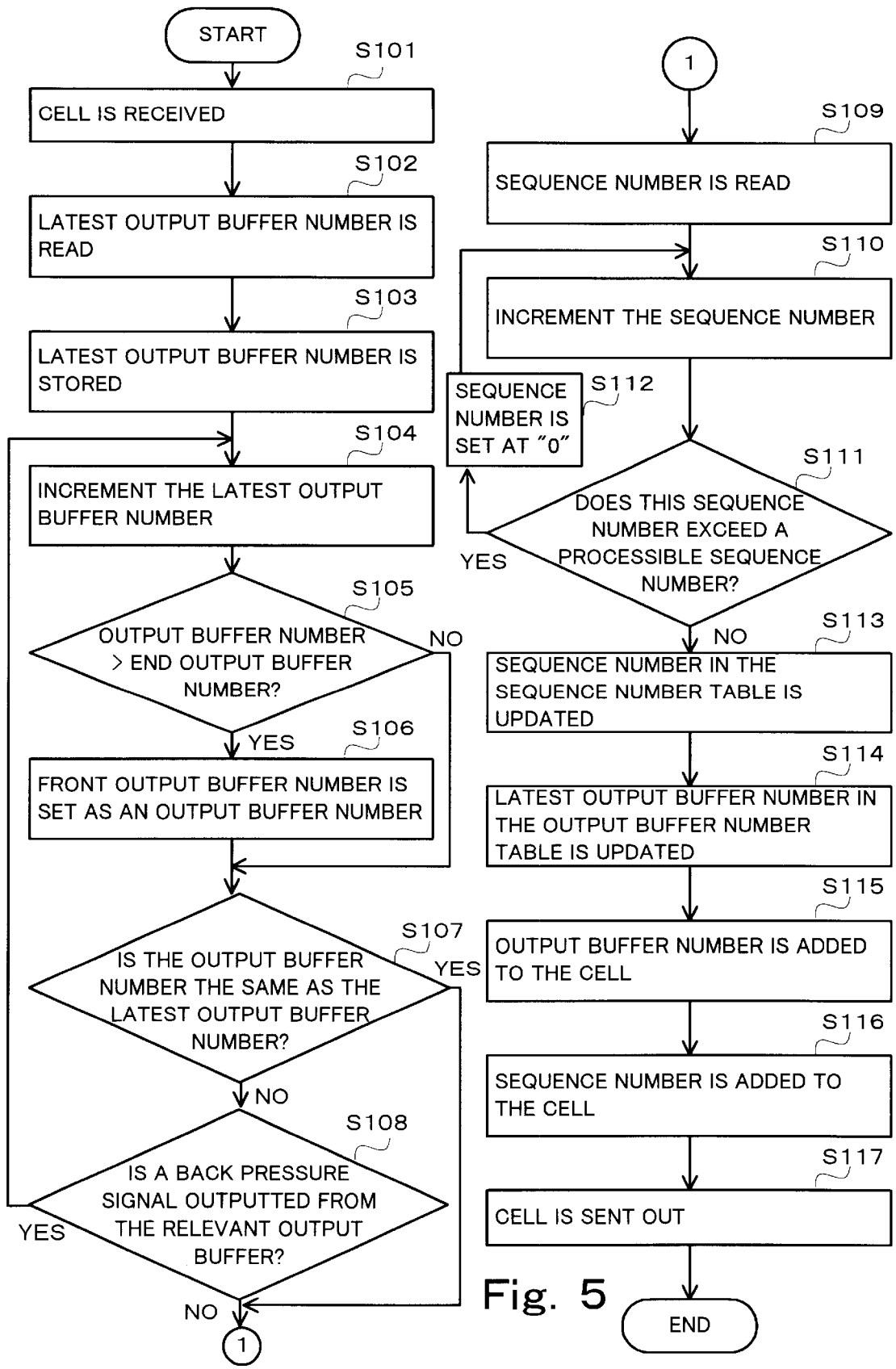
FIG. 5 is a flowchart for explaining an output buffer specifying operation and a sequence number adding operation in the numbering part shown in FIG. 2.

FIG. 5 is a flowchart for explaining an output buffer specifying operation and a sequence number giving operation in the numbering parts 51-1 to 51-5 shown in FIG. 2.

When a cell is inputted from an input buffer 22 (step S101), the representative output circuit number and the logical connection number given to the cell are detected by the header information detecting part 53, and the latest output buffer number corresponding to the detected representative output circuit number is read out by the sequence number control part 55 from the buffer number table 57 (step S102).

Next, the latest output buffer number read out from the output buffer number table 57 is temporarily stored in the sequence number control part 55 for a process described later (step S103).

Hereupon, as described above in case that there is the possibility that overflow of cells occurs in the output buffers 13-1 to 13-8 (see FIG. 1), a back pressure signal is outputted to the input buffers 22-1 to 22-5 (see FIG. 1) and the numbering parts 51. In case that a plurality of output buffers correspond to a representative output circuit, a numbering part 51 performs a process of selecting an output buffer to which a back pressure signal is not outputted. In case that a back pressure signal is outputted from every output buffer, since a selection process is not converged and selection of any buffer has the same condition, a process is performed so as to use the latest output buffer read out, as described later.

Next, in order to specify an output buffer number to be used at this time, "1" is added to the latest output buffer number read out (step S104).

Next, it is judged whether or not the output buffer number specified in step S104 is larger than the end output buffer number corresponding to the relevant representative output circuit number (step S105), and in case that it is judged to be larger, the forefront output buffer number corresponding to said representative output circuit is set as the output buffer number (step S106). This means that an available output buffer is selected cyclically in order, and in case that only one output buffer corresponds to that, the same output buffer number is always selected. And in case that it is judged that an output buffer number specified in step S104 is not larger than the end output buffer number in step S105, the process is not performed in step S106 but proceeds to step S107.

Next, it is judged whether or not a set output buffer number is the same as the latest output buffer number stored in the sequence number control part 55 (step S107), and a fact that it is judged to be the same means that the process has made a round of output buffers to be selected by a process of skipping an output buffer by a back pressure signal in the next process step. Therefore, since selection of any output buffer has the same condition in this case, the latest output buffer stored is selected.

And in case that in step S107 it is judged that a set output buffer number is not the same as the latest output buffer number stored in the sequence number control part 55, it is checked whether or not a back pressure signal is outputted from the corresponding output buffer (step S108). In case that a back pressure signal is outputted, the process skips the set output buffer number and returns to step S104, and sets the next selectable output buffer as an output buffer to be selected. And in case that a back pressure signal is not outputted, the output buffer selection process is ended.

Next, an operation of giving a sequence number corresponding to a logical connection number detected by the header information detecting part 53 is described. A sequence number corresponding to a logical connection number detected by the header information detecting part 53 is read out from the sequence number table 56 by the sequence number control part 55 (step S109).

Next, "1" is added to the sequence number read out in step S109 (step S110).

Next, it is judged whether or not this sequence number exceeds a sequence number capable of being processed by order restoring parts 62-1 to 62-5 (see FIG. 1) (step S111). Namely, an order restoring part performs a control of outputting sequence numbers in ascending order of number while temporarily storing cells in a buffer, and gives a sequence number to a cell in a range of the number of cells which can be stored in the buffer and can be controlled in order (within the depth of a buffer). Therefore, in case that it is judged that the sequence number does not exceed that number, the sequence number of the sequence number table 56 is updated (step S113) and the latest output buffer number in the output buffer number table 57 is updated to the output buffer number set in step S106 (step S114).

And in case that in step S111 it is judged that the sequence number having "1" added in step S110 exceeds a sequence number capable of being processed by the order restoring parts 62-1 to 62-5 (see FIG. 1), the sequence number is set at "0" (step S112) and the process returns to step S110.

After this, an output buffer number selected in the cell header information adding part 58 is added to a cell (step S115) and a sequence number is added to the cell (step S116), and the cell in such a form as shown in an output cell example of FIG. 2 is outputted (step S117).

As described above, in the input side of an ATM switch according to the present invention, a sequence number and a routed output buffer number are added to each cell by numbering parts 51-1 to 51-5. And cells inputted from a high-speed input port 21-1 of 2.4 G bps are separated by a demultiplexer 52 cyclically to four paths each having a transmission rate of 600 Mbps, and are multiplexed by a multiplexer 11 together with cells inputted through the other input ports 21-2 to 21-5 each having a transmission rate of 600 Mbps and are outputted onto a bus having a transmission rate of 5 G bps. The cells outputted onto the said bus pass through address filters 12-1 to 12-8 corresponding to the output buffer numbers added to these cells and are stored in the respective output buffers 13-1 to 13-8. In such a way, cells inputted through the high-speed input port and cells inputted through an ordinary input port are processed without being distinguished from each other from when they are inputted into the multiplexer 11 until they are stored into their routed output buffers. Due to a fact that the ATM switch is a switch, a cell inputted through the high-speed input port of 2.4 G bps can be routed to an output port of 600 Mbps, and conversely a cell inputted through an input port of 600 Mbps can be routed to the high-speed output port of 2.4 G bps.

Cells stored in the output buffers 13-1 to 13-4 corresponding to the high-speed output port are read out from the output buffers 13-1 to 13-4, and then are multiplexed by the multiplexer 61, inputted into the order restoring part 62-1, arranged in order of sequence numbers and then outputted to the output circuit 40-1 through the output port 63-1. And cells stored in the output buffers 13-5 to 13-8 corresponding to the other output ports each having a transmission rate of 600 Mbps are read out at the output circuit speed, and then are inputted into the order restoring parts 40-2 to 40-5 corresponding to these circuits.

Figure 7:
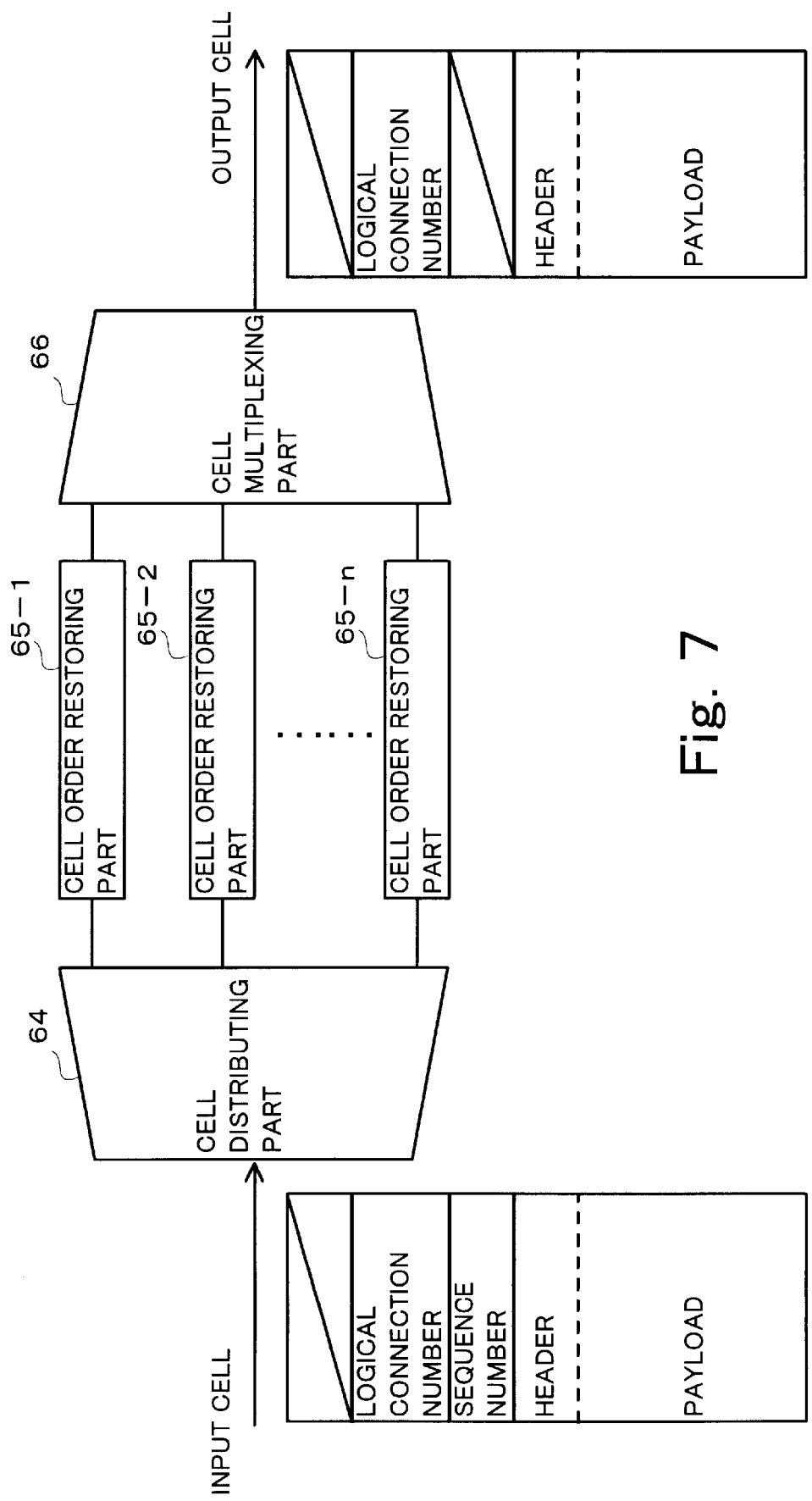
FIG. 7 is a block diagram showing the composition of a order restoring part shown in FIG. 1.

FIG. 7 is a block diagram showing the composition of each of the order restoring parts 62-1 to 62-5 shown in FIG. 1.

As shown in FIG. 7, each of the order restoring parts 62-1 to 62-5 in this embodiment is composed of a cell distributing part 64 for distributing cells to each connection on the basis of a sequence number added to each cell, a cell order restoring parts 65-1 to 65-$n$ for rearranging cells in order of sending the cells on the basis of the sequence numbers added to the cells, and a cell multiplexing part 66 for multiplexing the cells restored in order of sending out by the cell order restoring parts 65-1 to 65-$n$, and cells separated by the demultiplexer 52 are rearranged in the right order for each connection by the order restoring parts 62-1 to 62-5 and outputted through the output ports 63-1 to 63-5.

A cell switching operation in the above-mentioned output buffer type ATM switch is described in the following. In order to make clear the features of the present invention, a cell switching operation of switching cells from the input circuits 30-2 to 30-5 each having an ordinary transmission rate (600Mbps) in this switch and a cell switching operation of switching cells from the input circuit 30-1 having a faster transmission rate (2.4 G bps) than the transmission rate in this switch are explained separately from each other.

Figure 8:
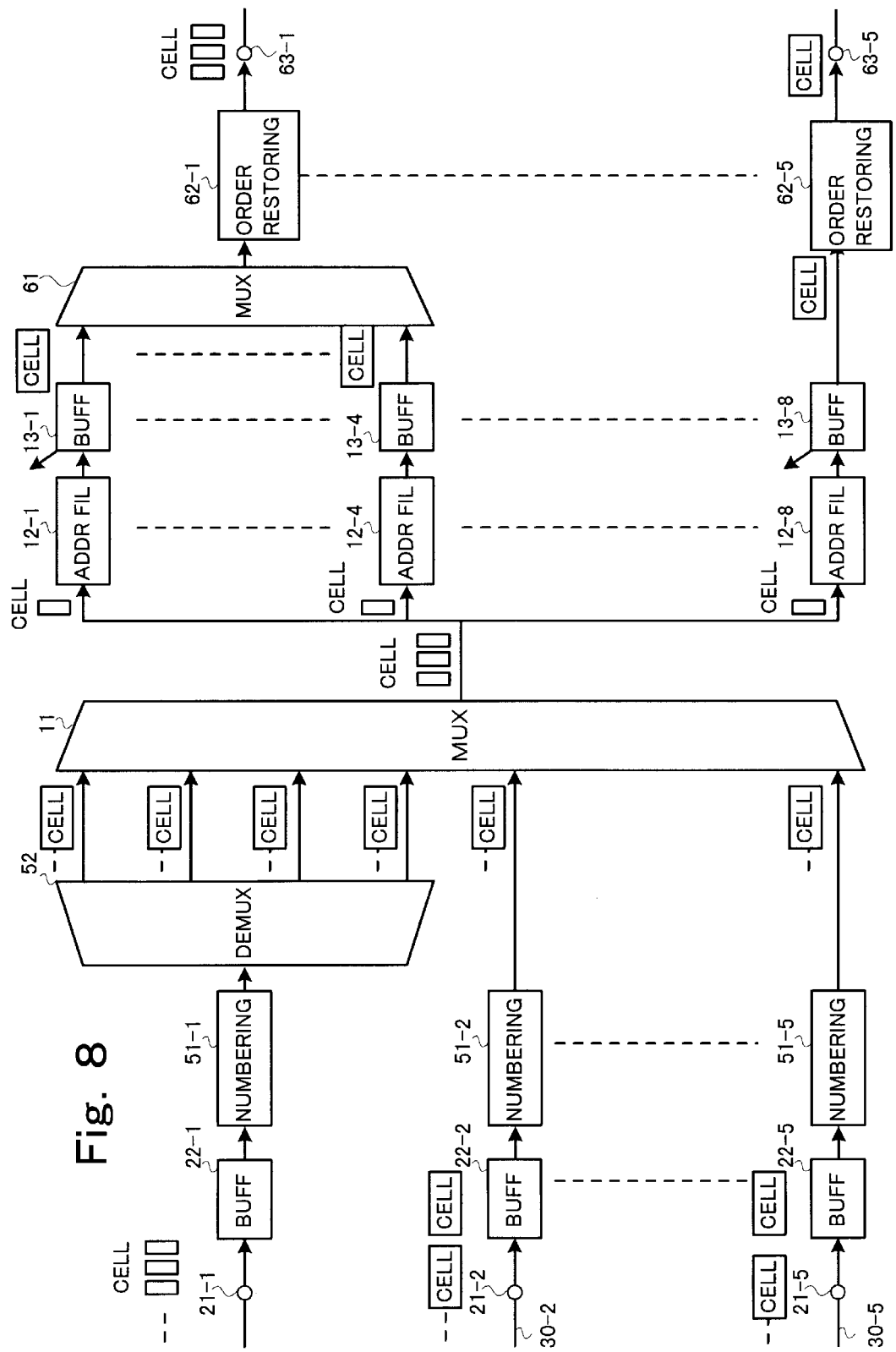
FIG. 8 is a diagram showing a flow of cells in the output buffer type ATM switch shown in FIG. 1.
Figure 9:
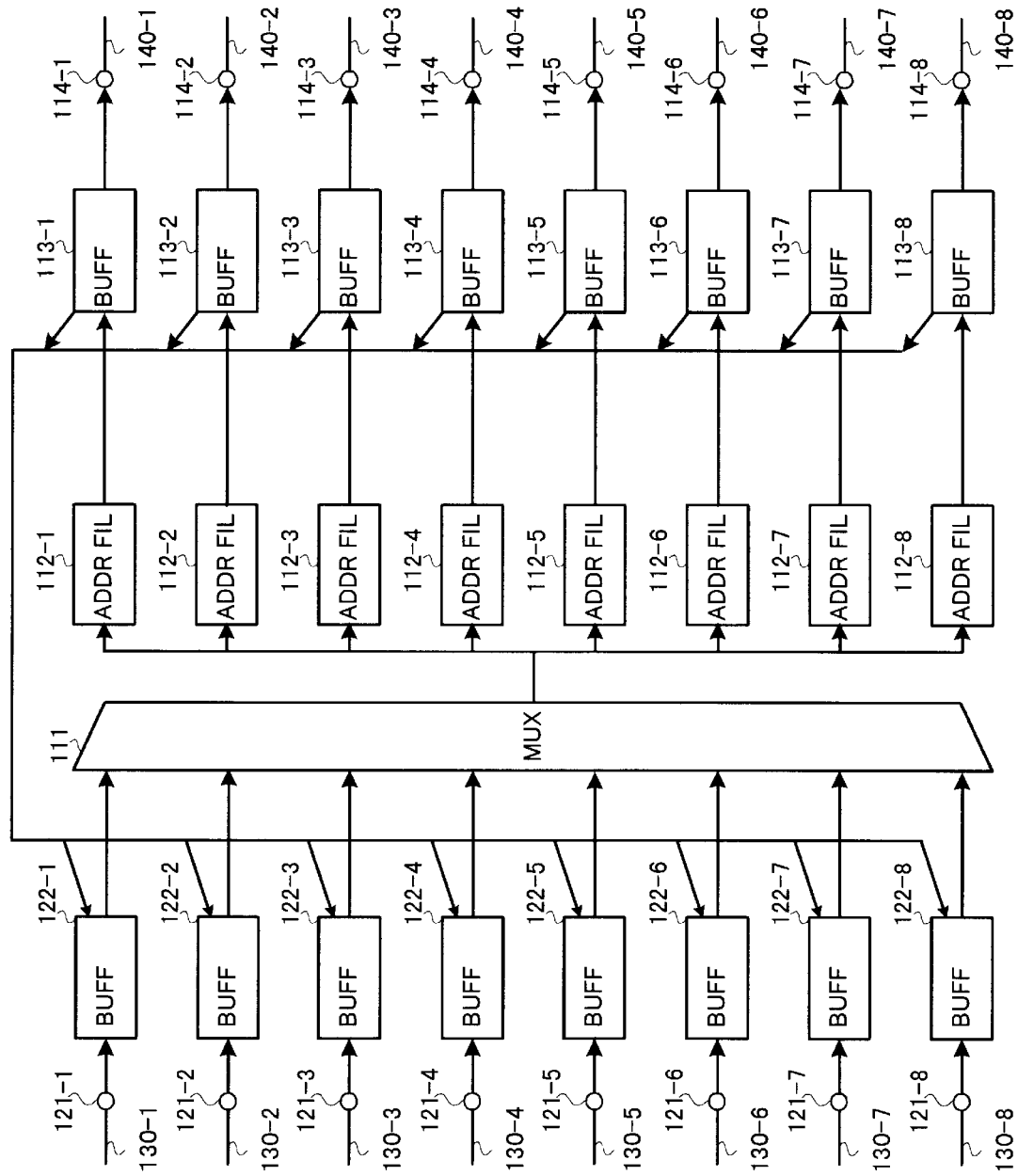
FIG. 9 is a diagram showing a composition example of a conventional output buffer type ATM switch.

FIG. 8 shows a flow of cells in the output buffer type ATM switch shown in FIG. 1.

First, a switching operation of switching cells from the input circuits 30-2 to 30-5 is described. Cells inputted from the input circuits 30-2 to 30-5 are inputted into the input buffers 22-2 to 22-5 through the input ports 21-2 to 21-5, and further are given sequence numbers in order of inputting the cells correspondingly to their logical connection numbers in the numbering parts 51-2 to 51-5 and then are inputted into the multiplexer 11. In the multiplexer 11, the cells are multiplexed together with cells inputted through another port and are outputted onto a bus having a transmission rate of 5 G bps.

Next, the cells outputted onto the bus having a transmission rate of 5 G bps pass through address filters corresponding to output buffer numbers added to the cells out of address filters 12-1 to 12-8 on the basis of additional information added by converting representative output circuit numbers into output buffer numbers by the numbering parts 51-1 to 51-5 and are inputted to the output buffers 13-1 to 13-8. Hereupon, the address filters 12-1 to 12-4 and the output buffers 13-1 to 13-4 are provided correspondingly to the output circuit 40-1 having a transmission rate of 2.4 G bps.

In the output buffers 13-1 to 13-8, the cells outputted onto the bus at a transmission rate of 5 G bps from the multiplexer 11 are temporarily stored and outputted at a transmission rate of 600 Mbps.

Hereupon, the cells outputted from the output buffers 13-1 to 13-4 need to be outputted from the output port 63-1 at a transmission rate of 2.4 G bps. Therefore, the cells outputted from the output buffers 13-1 to 13-4 are multiplexed by the multiplexer 61, are corrected in order of outputting the cells by the order restoring part 62-1, and then are outputted to the output circuit 40-1 through the output port 63-1 at a transmission rate of 2.4 G bps.

And the cells outputted from the output buffers 13-5 to 13-8 are corrected in order of outputting the cells by the order restoring part 62-2 to 62-5, and then outputted to the output circuits 40-2 to 40-5 through the output ports 63-2 to 63-5 at a transmission rate of 600 Mbps left as original.

In case that there is the possibility that some cells are lost by overflow of cells caused by a fact that output of the cells lags behind input of them in the output buffers 13-1 to 13-8, a back pressure signal is sent from the output buffers 13-1 to 13-8 to the input buffers 22-1 to 22-5 and the numbering parts 51-1 to 51-5. By this, cells addressed to the relevant output circuits 40-1 to 40-5 are temporarily stored in the input buffers 22-1 to 22-5 and sending cells to the output buffers 13-1 to 13-8 in which overflow of cells may occur is stopped temporarily. And since operation of the numbering parts 51-2 to 51-5 by a back pressure signal from the output buffers 13-1 to 13-8 was described with reference to FIG. 5, description of it is omitted here.

Next, a cell switching operation of switching cells from the input circuit 3-1 is described.

When cells from the input circuit 30-1 are inputted through the input port 21-1 and the input buffer 22-1, they are added sequence numbers in order of inputting the cells correspondingly to their logical connection numbers in the numbering part 51-1 and are added the output buffer numbers into which their representative output circuit number is converted. Since operation of the numbering part 51-1 was described with reference to FIG. 5, description of it is omitted here.

The cells added the sequence numbers and the output buffer numbers by the numbering part 51-1 are inputted into the demultiplexer 52 and are separated by the demultiplexer 52 to four paths each having a transmission rate of 600 Mbps.

The cells separated by the demultiplexer 52 are multiplexed together with cells from the other input ports by the multiplexer 11 and are outputted onto the bus having a transmission rate of 2.4 G bps.

Next, the cells outputted onto the bus having a transmission rate of 5 G bps pass through address filters corresponding to output buffer numbers added to the cells out of the address filters 12-1 to 12-8 on the basis of additional information added by converting the representative output circuit number into the output buffer numbers by the numbering part 51-1 and are inputted into the output buffers 13-1 to 13-8. Hereupon, the address filters 12-1 to 12-4 and the output buffers 13-1 to 13-4 are provided correspondingly to the output circuit 40-1 having a transmission rate of 2.4 G bps. And in the output buffers 13-1 to 13-8, the cells outputted onto the bus at a transmission rate of 5 G bps from the multiplexer 11 are temporarily stored and outputted at a transmission rate of 600 Mbps.

Since the operation after this is the same as the cell switching operation of switching cells from the input circuits 30-2 to 30-5, description of it is omitted.

As described above, an output buffer type ATM switch according to the present invention makes possible a switching operation by having high-speed input and output ports higher in transmission rate than ordinary input and output ports (2 or larger integer times higher in transmission rate than ordinary input and output ports). First, the high-speed input port is made equal in transmission rate to the other input ports by the demultiplexer 52. At this time, cells are outputted from a plurality of ports the number of which is obtained by dividing the transmission rate of the high-speed input port by the transmission rate of each of the other input ports. The multiplexer 11 multiplexes cells inputted from the plurality of input ports obtained by a transmission rate conversion of the high-speed input port and cells inputted from the other input ports without distinguishing them, and then a switching operation after this is performed. Namely, since output destination information corresponding to VPI/VCI in the header of each cell has been given to each cell in a process in a stage before this switch, the cells are distributed to output buffers corresponding to the output destination information through address filters. The cells stored in the output buffers are read out at the transmission rate of the output buffers and are outputted from the said switch. Therefore, since cells to be outputted are stored in a plurality of ports the number of which is obtained by dividing the transmission rate of the high-speed output port by the transmission rate of the other output ports with respect to the high-speed output port, the cells are read out and multiplexed by the multiplexer 61 and returned to the original high-speed transmission rate, and then outputted.

In such a way, cells corresponding to the high-speed input and output ports are separated cyclically to a plurality of ports at the input side, and are stored in a plurality of output buffers and then multiplexed at the output side. Therefore, cells having the same logical connection number which are inputted through the high-speed input port (it does not matter if the output destination them is an ordinary port or a high-speed port) are separated to a plurality of ports by the demultiplexer 52 and multiplexed with other cells by the multiplexer 11, and when they are stored in the output buffers being their output destinations through the address filters 12-1 to 12-8, the cells are in a state where the order of the cells having the same logical connection number is not guaranteed. And since cells to be outputted through the high-speed output port (it does not matter if their input source is an ordinary port or a high-speed port) are controlled so that a plurality of output buffers corresponding to them are used without being biased, the cells outputted from the multiplexer 61 are in a state where the order of the cells having the same logical connection number is not guaranteed.

The numbering parts 51-1 to 51-5 provided in the input ports 21-1 to 21-5 and the order restoring parts 62-1 to 62-5 provided in the output ports 63-1 to 63-5 are provided in order to control the order of cells as described above. And the numbering parts 51-1 to 51-5 control selectively a plurality of output buffers corresponding to the high-speed output port so that they are uniformly used.

As described above, the present invention separates cells inputted through a high-speed input port in a demultiplexer so that they are equal in transmission rate to cells through other ordinary ports, and multiplexes cells to be outputted through a high-speed output port by a second multiplexer so that they have the same transmission rate as the high-speed output port, and thereby makes it possible to input and output cells into and from circuits each having a high-speed transmission rate, and further gives a cell a number indicating the order in which the cell has been inputted in each of a plurality of numbering parts provided correspondingly to a plurality of input ports and rearranges cells outputted from the output buffers in the order in which the cells have been inputted on the basis of the numbers added to the said cells in the order restoring parts provided correspondingly to a plurality of output ports, and thereby can compensate the order of sending out the cells distributed and stored into a plurality of output buffers corresponding to the high-speed output port.

Thus, the present invention can realize a cell switching operation of switching cells of a connection being higher in transmission rate than a switch port by means of an existing switch.

What is claimed is:

1. An output buffer type asynchronous transfer mode switch comprising;
   a plurality of input ports into which cells from input circuits are inputted,
   a first multiplexer for multiplexing cells inputted through said plurality of input ports,
   a plurality of output ports for sending out cells to output circuits, a plurality of filters which are provided correspondingly to said output ports and make only the cells addressed to the corresponding output ports out of cells multiplexed by said first multiplexer pass through them, and a plurality of output buffers for temporarily storing in them the cells which have passed through said plurality of filters, wherein;

at least one input port out of said plurality of input ports and at least one output port out of said plurality of output ports are respectively a high-speed input port and a high-speed output port each having a transmission rate being 2 or larger integer times higher than the other input and output ports, respectively, and said asynchronous transfer mode switch comprises;

numbering parts which are provided correspondingly to said plurality of input ports and add a sequence number indicating the order in which said cell has been inputted for its logical connection number to a cell inputted from each of said plural input ports, a demultiplexer for separating cells which are inputted through said high-speed input port and each are given a number by said numbering part to a plurality of paths so that said cells become equal in transmission rate to cells inputted through the other input ports than said high-speed input port, a second multiplexer for multiplexing and outputting cells outputted from a plurality of output buffers corresponding to said high-speed output port out of said plurality of output buffers at the transmission rate of said high-speed output port, and order restoring parts which are provided correspondingly to said plurality of output ports and which, on the basis of said sequence numbers added to the cells multiplexed and outputted by said second multiplexer and the cells outputted from the other output buffers than the output buffers corresponding to said high-speed output port, correct the order of outputting said cells and output them, and wherein;

said first multiplexer multiplexes the cells inputted through the other input ports than said high-speed input port and the cells separated by said demultiplexer.

2. An output buffer type asynchronous transfer mode switch according to claim 1, comprising input buffers in which cells inputted through said plurality of input ports are temporarily stored, wherein;

each of said plurality of output buffers sends a signal to stop the cells addressed to the output buffer itself being sent to said input buffers when the number of cells to be stored in the said output buffer exceeds a predetermined threshold value, and each of said input buffers temporarily stores in it cells addressed to the output buffer which has sent said signal when it receives the said signal.

3. An output buffer type asynchronous transfer mode switch according to claim 2, wherein;

said input buffers are provided correspondingly to said plurality of input ports.

4. An output buffer type asynchronous transfer mode switch according to claim 1, wherein;

said numbering part comprises;

a header information detecting part for detecting an output circuit number and a logical connection number from a cell inputted through said input port, a sequence number table in which a sequence number added to a cell transmitted at the last time by a logical connection is set for each logical connection number, an output buffer number table in which information about said plurality of output buffers is stored, a sequence number control part for retrieving said sequence number and said output buffer number from said sequence number table and said output buffer number table on the basis of an output circuit number and a logical connection number detected by said header information detecting part, and a cell header information adding part for adding a sequence number and an output buffer number retrieved by said sequence number control part to a cell.

5. An output buffer type asynchronous transfer mode switch according to claim 4, wherein;

said order restoring part comprises;

a cell distributing part for distributing cells to each connection on the basis of logical connection numbers given to the cells, a plurality of cell order restoring parts each of which corrects the order of sending cells on the basis of sequence numbers added to the cells, and a cell multiplexing part for multiplexing cells corrected in order of sending by said plurality of cell order restoring parts.

6. An output buffer type asynchronous transfer mode switch according to claim 4, wherein;

said output buffer number table stores in it the number of each of said output circuits, the forefront output buffer number and the end output buffer number in an output circuit corresponding to each output circuit number, and the latest output buffer number added to a cell transmitted at the last time out of output buffers included between the forefront output buffer number and the end output buffer number.

7. An output buffer type asynchronous transfer mode switch according to claim 6, wherein;

said sequence number control part, when adding said output buffer number to a cell, increments said latest output buffer number, sets said incremented number as a number to be added to the cell in case that the incremented number is not larger than the end output buffer number in said output circuit, and sets said latest buffer number as a number to be added to the cell as the forefront output buffer number in the said output circuit in case that the incremented number is larger than the end output buffer number.

8. An output buffer type asynchronous transfer mode switch according to claim 6, wherein;

said sequence number control part, when adding said sequence number to a cell, increments a sequence number corresponding to a logical connection number added to the cell, sets said incremented number as a number to be added to the cell in case that the incremented number is not larger than a number capable of being processed by said order restoring part, and sets said sequence number at "0" in case that the incremented number is larger than the number capable of being processed by said order restoring part and then sets a number obtained by incrementing the said number as a number to be added to the cell.

9. An output buffer type asynchronous transfer mode switch according to claim 7, wherein;

said sequence number control part, when adding said sequence number to a cell, increments a sequence number corresponding to a logical connection number added to the cell, sets said incremented number as a number to be added to the cell in case that the incremented number is not larger than a number capable of being processed by said order restoring part, and sets said sequence number at "0" in case that the incremented number is larger than the number capable of being processed by said order restoring part and then sets a number obtained by incrementing the said number as a number to be added to the cell.

10. An output buffer type asynchronous transfer mode switch according to claim 6, wherein;

said sequence number control part, when a signal to stop a cell addressed to said output buffer being sent is sent from the said output buffer, does not give a cell the number of the output buffer which has sent the said signal.

11. An output buffer type asynchronous transfer mode switch according to claim 7, wherein:

said sequence number control part, when a signal to stop a cell addressed to said output buffer being sent is sent from the said output buffer, does not give a cell the number of the output buffer which has sent the said signal.

12. An output buffer type asynchronous transfer mode switch according to claim 8, wherein:

said sequence number control part, when a signal to stop a cell addressed to said output buffer being sent is sent from the said output buffer, does not give a cell the number of the output buffer which has sent the said signal.

13. An output buffer type asynchronous transfer mode switch according to claim 9, wherein:

said sequence number control part, when a signal to stop a cell addressed to said output buffer being sent is sent from the said output buffer, does not give a cell the number of the output buffer which has sent the said signal.

* * * * *